US007656471B2

(12) United States Patent
Ota et al.

(10) Patent No.: US 7,656,471 B2
(45) Date of Patent: Feb. 2, 2010

(54) LIQUID CRYSTAL DISPLAY DEVICE

(75) Inventors: Yuzo Ota, Hitachi (JP); Tomokazu Yoneya, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 223 days.

(21) Appl. No.: 11/871,452

(22) Filed: Oct. 12, 2007

(65) Prior Publication Data

US 2008/0129916 A1 Jun. 5, 2008

(30) Foreign Application Priority Data

Oct. 13, 2006 (JP) ............................. 2006-280138

(51) Int. Cl.
*G02F 1/1333* (2006.01)

(52) U.S. Cl. .............................. 349/58; 463/20; 463/46

(58) Field of Classification Search .................... 349/58
See application file for complete search history.

(56) References Cited

U.S. PATENT DOCUMENTS 6,937,298 B2 * 8/2005 Okada ......................... 349/58

FOREIGN PATENT DOCUMENTS

| | | |
|---|---|---|
| JP | 11-089995 | 4/1999 |
| JP | 11-305246 | 11/1999 |
| JP | 2004-329687 | 11/2004 |

* cited by examiner

*Primary Examiner*—Richard H Kim
(74) *Attorney, Agent, or Firm*—Antonelli, Terry, Stout & Kraus, LLP.

(57) ABSTRACT

A liquid crystal display device includes a liquid crystal display panel and a backlight. The liquid crystal display device has a hole in the screen. The hole of the liquid crystal display panel has a first protecting member; and the hole of the backlight has a second protecting member. The liquid crystal display panel hole and the backlight hole form a common hole. The common hole has a third protecting member. With this structure, the viewer can see another display in the liquid crystal display screen without feeling a noticeable difference.

11 Claims, 14 Drawing Sheets

LIQUID CRYSTAL DISPLAY DEVICE

CROSS-REFERENCE TO RELATED APPLICATION

The present application claims priority from Japanese application JP2006-280138 filed on Sep. 13, 2006, the content of which is hereby incorporated by reference into this application

BACKGROUND OF THE INVENTION

1. Field of the Invention

The present invention relates to liquid crystal display display devices, and more particularly, to a display device having a through hole in the screen, in which another display can be provided or an object can be inserted.

2. Description of the Related Art

It is widely practiced in slot-machine-type game machines or the like that liquid crystal display devices have a fixed area of transparent portion at part of the screen, at which another display is provided. Slot-machine-type game machines have three rotating drums in the center of the surface facing the player, the rotation axes being in agreement with one another in the horizontal direction. The rotating drums are rotated by pressing a start button, and then stopped in sequence by pressing stop buttons corresponding to the rotating drums.

Mainstream liquid crystal display devices for use in display devices have a structure in which part of the color filter of the liquid crystal panel is removed, the polarizer and the optical sheet of the back light are bored, and the light guide of the backlight and part of the optical sheet are partially made transparent so that the back of the liquid crystal display device can be seen through. An example of this technique is disclosed in JP-A-2004-329687 (Patent Document 1).

Another technique of forming holes in liquid crystal display devices used in pachinko machines, through which pachinko balls are passed, is disclose, for example, in JP-A-11-89995 (Patent Document 2). Another technique of forming a hole in the center of liquid crystal display panels for use in watches, in which the shafts of hands in watches are passed, is disclosed in JP-A-11-305246 (Patent Document 3).

With the structure of the present display devices, the portion to be transparent for another display has layers of glass or sheet. This structure leads to a decrease in transparency of the portion to be transparent or reflection or leakage of light from the backlight, affecting the visibility of the back. Although Patent Document 1 describes a display device having holes in the liquid crystal display panel and the backlight, a concrete practical structure is not disclosed and is not in practical use in the present.

Patent Document 2 discloses a technique of forming simple holes in a liquid crystal display panel. However, Patent Document 2 provides no disclosure and suggestion on the problem of mechanical breakage around the hole of the liquid crystal display panel. It also provides no suggestion on application to a complicated structure in which a liquid crystal display panel having a backlight and capable of various image displays can provide another display.

The technique described in Patent Document 3 is for special use such as watches. It provides no suggestion on application to large liquid crystal display devices having a backlight and capable of another display on the display screen.

SUMMARY OF THE INVENTION

In a relatively large liquid crystal display device capable of providing a first display and a second display on the liquid crystal display panel, a portion for the second display has a hole in each of the liquid crystal display panel and the backlight, in which the second display is provided. The holes of the liquid crystal display panel and the backlight each have a protecting member. The protecting member in the hole of the liquid crystal display panel prevents cracks of the glass substrate of the liquid crystal display panel. The protecting member in the hole of the backlight prevents foreign matter from entering the backlight. Specific means therefor are as follows:

According to a first aspect of the invention, there is provided a display device including: a liquid crystal display panel having a liquid crystal display panel hole, the liquid crystal display panel hole having a first protecting member around the inner periphery thereof; and a backlight having a backlight hole, the backlight hole having a second protecting member around the inner periphery thereof. The liquid crystal display panel hole and the backlight hole form a common hole.

Preferably, the first protecting member is made of metal, the metal being at a potential common to the reference potential of the liquid crystal display panel.

Preferably, the first protecting member is a metal tape having an adhesive on one side.

Preferably, the first protecting member is an insulator.

Preferably, the second protecting member is made of the same material as the protecting member around the inner periphery of the liquid crystal display panel hole.

Preferably, the second protecting member is made of a material different from the protecting member around the inner periphery of the liquid crystal display panel hole.

Preferably, the second protecting member is a light-shielding member.

According to a second aspect of the invention, there is provided a display device including, in layers: a liquid crystal display panel having a liquid crystal display panel hole, the liquid crystal display panel hole having a first protecting member around the inner periphery thereof; and a backlight having a backlight hole, the backlight hole having a second protecting member around the inner periphery thereof. The liquid crystal display panel hole and the backlight hole form a common hole, the common hole having a third protecting member around the inner periphery thereof.

Preferably, the third protecting member is made of metal, the metal being at a potential common to the reference potential of the liquid crystal display panel.

Preferably, the third protecting member is metal tape having an adhesive on one side.

Preferably, the third protecting member is an insulator.

According to a third aspect of the invention, there is provided a display device including, in layers: a liquid crystal display panel having a liquid crystal display panel hole, the liquid crystal display panel hole having a first protecting member around the inner periphery thereof; and a backlight having a backlight hole and a frame having a flange on the bottom, the backlight being housed in the frame, and the backlight hole having a second protecting member around the inner periphery thereof. The liquid crystal display panel hole and the backlight hole are fitted in the flange of the frame.

Preferably, the flange is made of metal, the metal being at a potential common to the reference potential of the liquid crystal display panel.

Preferably, the flange is an insulator.

According to a fourth aspect of the invention, there is provided a display device including, in layers: a liquid crystal display panel having a liquid crystal display panel hole, the liquid crystal display panel hole having a first protecting member around the inner periphery thereof; and a backlight having a backlight hole and a frame having a flange on the bottom, the backlight being housed in the frame, and the backlight hole having a second protecting member around the inner periphery thereof. The backlight hole is fitted in the flange of the frame.

Preferably, the flange is made of metal, the metal being at a potential common to the reference potential of the liquid crystal display panel.

Preferably, the flange is an insulator.

According to a fifth aspect of the invention, there is provided a display device including, in layers: a liquid crystal display panel having a liquid crystal display panel hole, the liquid crystal display panel hole having a protecting member around the inner periphery thereof; and a backlight having a backlight hole and a frame having a flange on the bottom, the backlight being housed in the frame. The backlight hole is fitted in the flange of the frame.

Preferably, the flange is made of metal, the metal being at a potential common to the reference potential of the liquid crystal display panel.

Preferably, the flange is an insulator.

The advantages of the invention will be described as follows:

Since the periphery of the hole of the liquid crystal display panel is protected by the first protecting member, no glass cracks occur. Moreover, the inner periphery of the hole of the backlight is protected by the second protecting member, thereby preventing foreign matter from entering the backlight. This allows another display to be provided in the hole of the display panel.

Since the first protecting member is made of metal, to which the reference potential is applied, an influence of electrification of the first protecting member on the display of the liquid crystal display panel can be prevented.

Since the first protecting member is made of metal tape having an adhesive on one side, the protection can be achieved easily and effectively.

Since the first protecting member is an insulator, sparks due to the first protecting member do not occur.

Since the second protecting member is made of the same material as the first protecting member, the cost of components can be reduced and the process of manufacture can be simplified.

Since different materials are used for the first protecting member and the second protecting member, optimum materials for the liquid crystal display panel and the backlight can be selected.

Since the second protecting member for the backlight is a light-shielding member, leakage of light from the backlight can be prevented.

Since a third protecting member is formed for the hole in addition to the first and second protecting members, the hole can be protected reliably.

Since the third protecting member is made of metal, to which a potential common to the reference potential of the liquid crystal display panel is applied, an influence on the liquid crystal display panel can be prevented and sparks can be prevented.

Since the third protecting member is a metal tape having an adhesive on one side, the protection is facilitated and necessary effects can be achieved.

Since the third protecting member is an insulator, the possibility of sparks between the protecting member and the other components is less than that of the case in which the metal becomes floats.

Since the flange of the backlight frame is used as a third protecting member, the advantages of the invention can be achieved at lower cost than using another third protecting member.

Since the flange of the backlight frame is made of metal, to which the reference potential of the liquid crystal display panel is applied, an influence of electrification on the liquid crystal display panel can be prevented and sparks can be prevented.

Since the backlight frame and the flange can be made of resin, this structure is advantageous in cost and weight.

Since the flange of the backlight frame acts as a third protecting member at least for the backlight hole, there is no need to form another third protecting member. Since the flange acts as a third protecting member in addition to the second protecting member at least for the backlight hole, the backlight can be protected reliably.

Since the flange of the backlight frame is made of metal, to which the reference potential is applied, the influence of electrification to images and sparks can be prevented.

Since the backlight frame and the flange can be made of resin, this structure is advantageous in cost and weight. Moreover, since the flange of the backlight frame acts as a third protecting member for the backlight hole, the cost can be reduced.

Since the flange of the backlight frame is used as the protecting member for the backlight hole, and the flange can also be used as a guide for assembling the backlight components, the cost of components and assembly can be reduced.

Since the backlight frame and the flange are made of metal, to which the reference potential of the liquid crystal display panel is applied, the backlight frame and the flange and also the protecting member for the backlight hole can be prevented from being electrified, and the possibility of sparks can be eliminated.

Since the backlight frame and the flange can be made of resin, this structure is advantageous in cost and weight. Moreover, since the flange of the backlight frame is used as a hole protecting member and as a guide to assemble the backlight components, the cost can be reduced.

DESCRIPTION OF THE PREFERRED EMBODIMENTS

The invention will be described in detail with reference to the following embodiments.

First Embodiment

Figure 1:
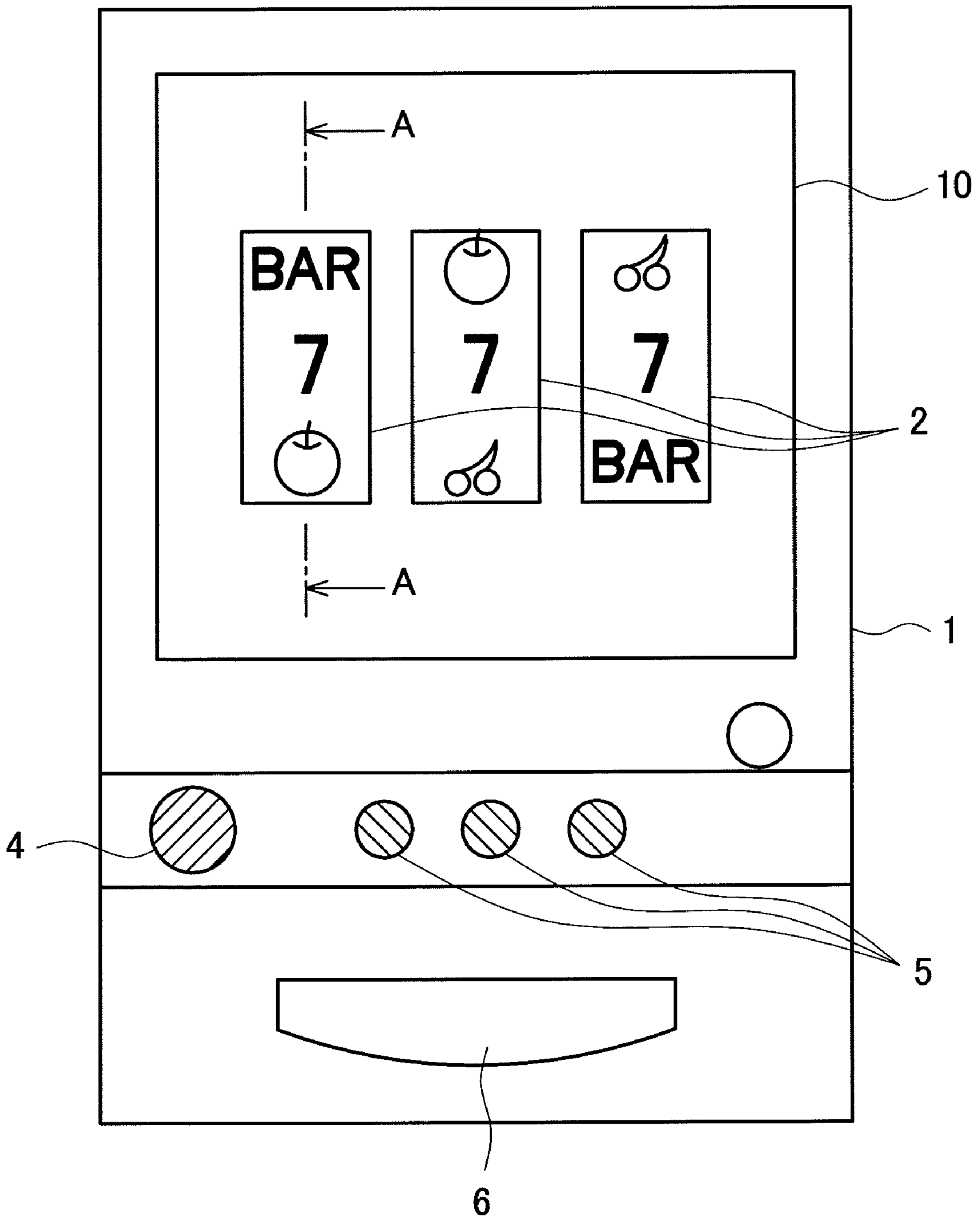
FIG. 1 is a front view of a slot machine.

FIG. 1 is a front view of a slot machine 1 incorporating the invention. The slot machine 1 has three rotating drums 2 arranged in the center horizontally coaxially with one another. Thus, the player can view only part of the circumferential surfaces of the rotating drums 2.

When the player presses a start button 4 at the lower part, the rotating drums 2 are rotated, so that the circumferences are moved, and when the player presses three stop buttons 5 in the vicinity of the start button 4, the rotating drums 2 corresponding to the stop buttons 5 are stopped.

If all the marks on the circumferential surfaces of the rotating drums 2 are the same (7, 7, 7 in FIG. 1) when the rotating drums 2 stop, many coins are ejected from a coin outlet port 6 at the lower part.

In FIG. 1, a large-size liquid crystal display device 3 has three holes near the center, through which the displays on the circumferential surfaces of the rotating drums 2 can be seen. In FIG. 1, since there is no glass substrate and optical sheet at the rotating drums 2, light from a backlight 20 is not reflected or leaks to the liquid crystal display panel.

Figure 2:
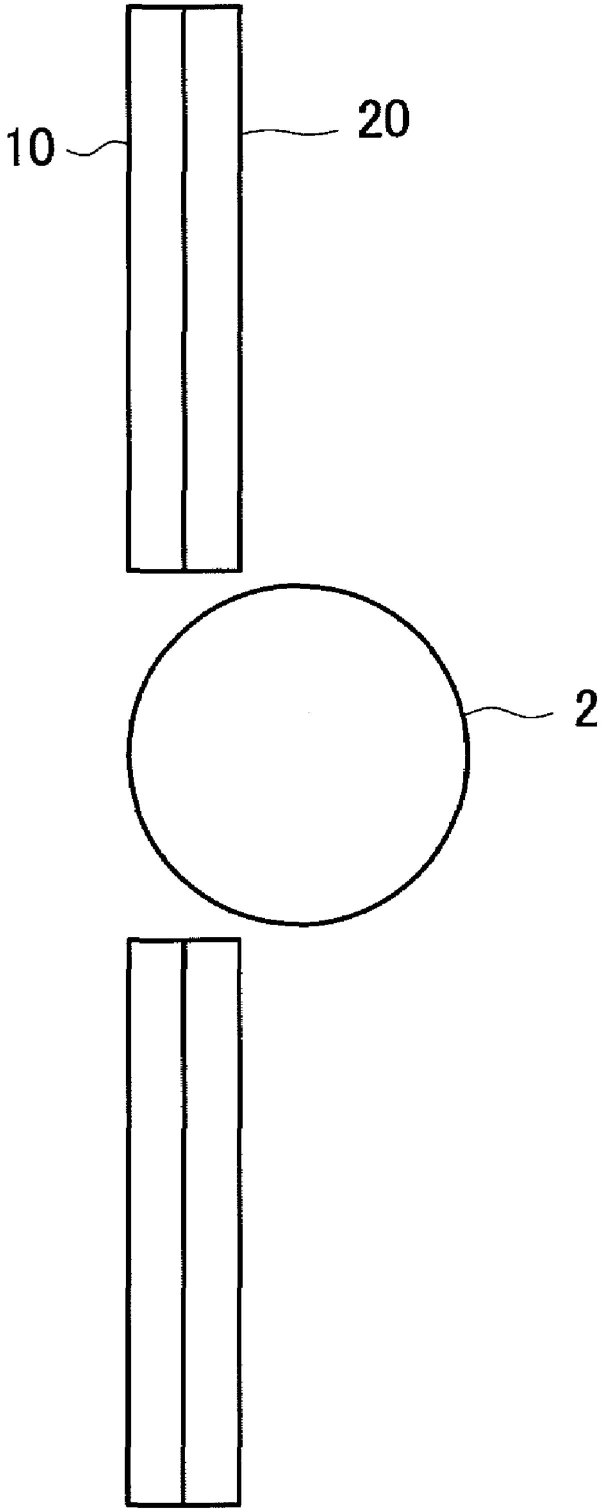
FIG. 2 is a schematic sectional view of the essential parts of the slot machine of FIG. 1.

FIG. 2 is a sectional view taken on line A-A of FIG. 1. FIG. 2 shows a liquid crystal display panel 10, the backlight 20, and the rotating drum 2 in simplified form. The liquid crystal display panel 10 and the backlight 20 each have holes, in which part of the circumferential surfaces of the rotating drums 2 are fitted so as to be viewed by the player. Since the liquid crystal display panel 10 and the backlight 20 have holes, the circumferential surfaces of the rotating drums 2 and the surface of the liquid crystal display panel 10 can be flush with each other, thus increasing the togetherness of the display on the circumferential surfaces of the rotating drums 2 and the display on the liquid crystal display panel 10. The circumferential surfaces of the rotating drums 2 may of course be disposed back from the surface of the liquid crystal display panel 10 in relation to the radius of the rotating drums 2 and the size of the holes. Also in this case, since there is no glass substrate and optical sheet on the rotating drums 2, the player does not feel a noticeable difference in viewing the rotating drums 2.

Figure 3:
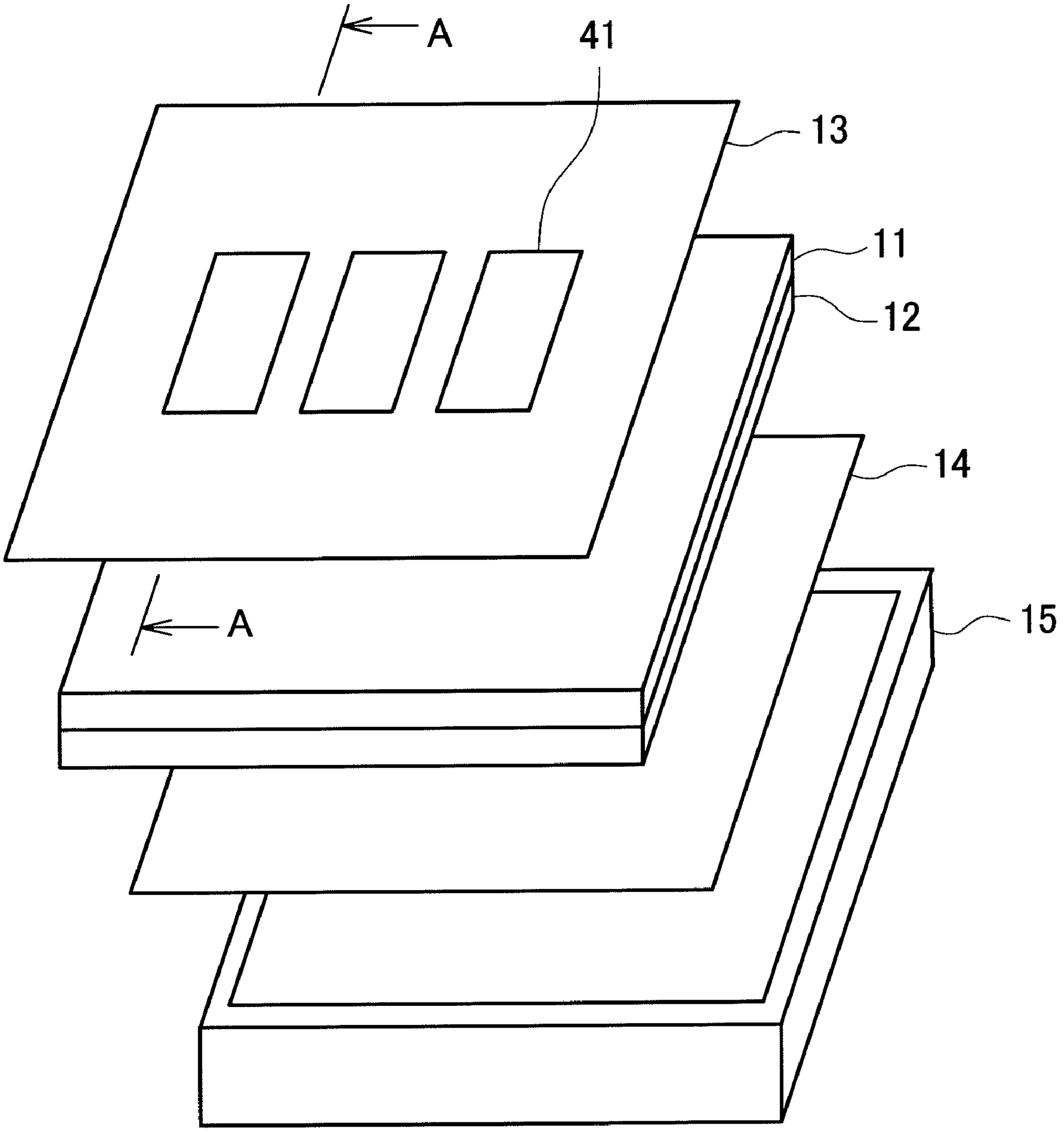
FIG. 3 is an exploded perspective view of a liquid crystal display panel.
Figure 4:
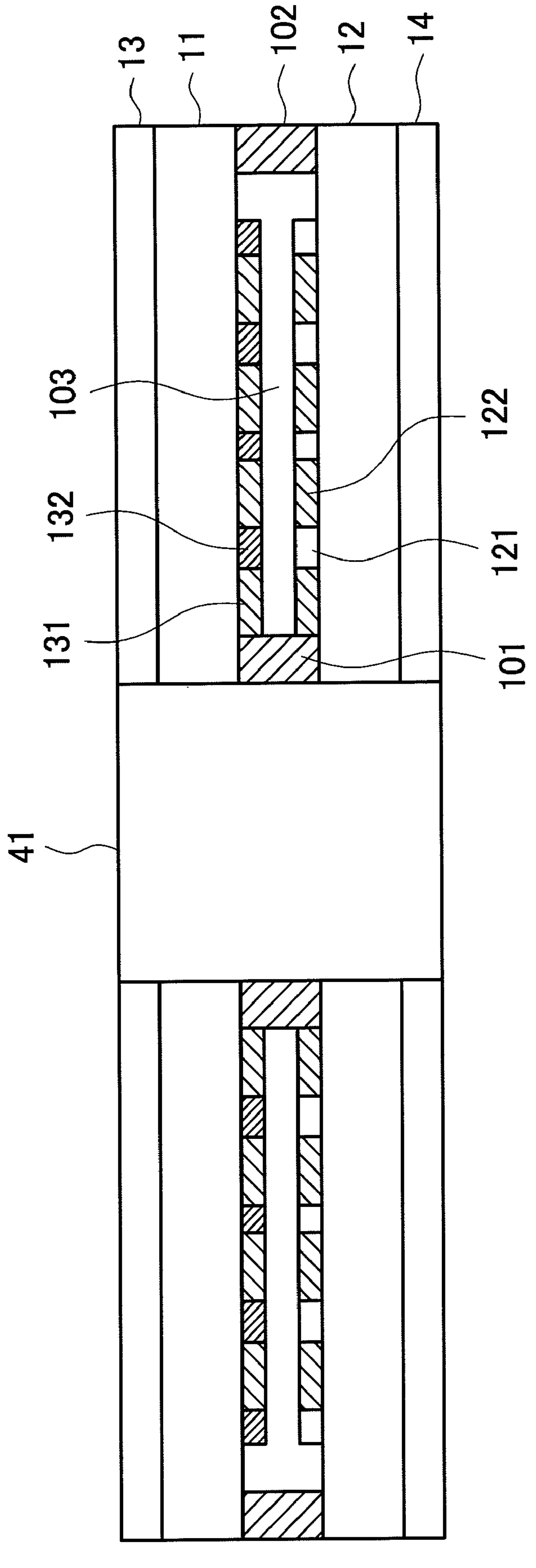
FIG. 4 is a sectional view of the liquid crystal display panel.

FIG. 3 is a perspective view of the components of the liquid crystal display panel 10. FIG. 4 is a sectional view taken along line A-A of FIG. 3 in which an upper polarizer 13, an upper substrate 11, a lower substrate 12, and a lower polarizer 14 are combined together. Liquid crystal 103 is sandwiched between the upper substrate 11 and the lower substrate 12 of the liquid crystal display panel 10. Light from the backlight 20 is controlled pixel by pixel by the liquid crystal 103 to form an image. To control light using the liquid crystal 103, the light must be polarized. Therefore, the light from the backlight 20 is converted to linear polarized light by the lower polarizer 14. The linear polarized light is modulated by the liquid crystal 103, then polarized by the upper polarizer 13, and thus recognized as an image.

Referring to FIG. 4, a pixel electrode 122 is provided for each pixel on the lower substrate 12. The liquid crystal 103 is activated by the potential difference between the pixel electrode 122 and a common electrode formed on the upper substrate 11. Thin-film transistors (TFT) 121 act as switches of image signals to the pixel electrodes 122. The light from the backlight 20 through the pixel electrode 122 and the liquid crystal 103 passes through color filters 131 formed on the upper substrate 11 to form a color image. Between the color filters 131 on the upper substrate 11 is provided a black matrix 132 for increasing the contrast of the image.

Figure 5:
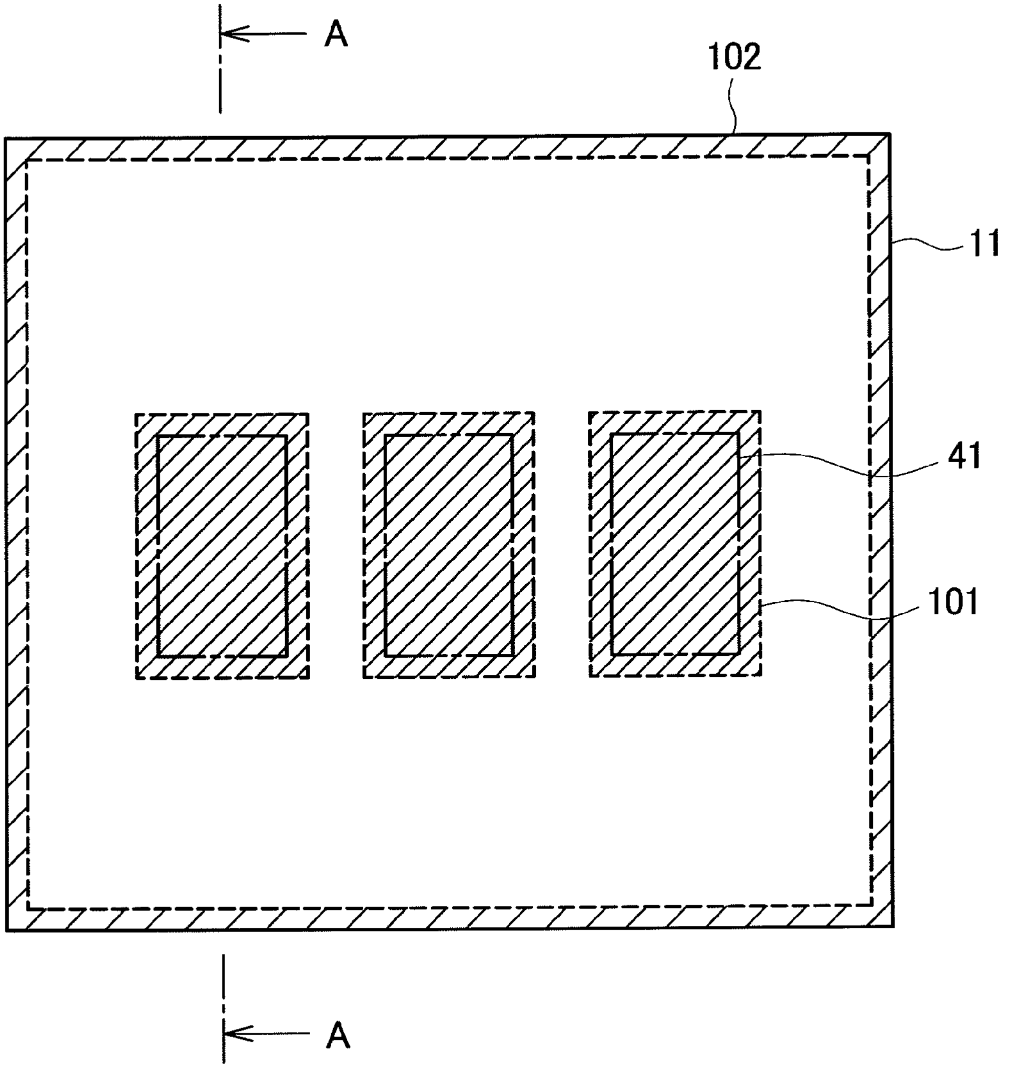
FIG. 5 is a plan view of the liquid crystal display panel during the course of processing.
Figure 6:
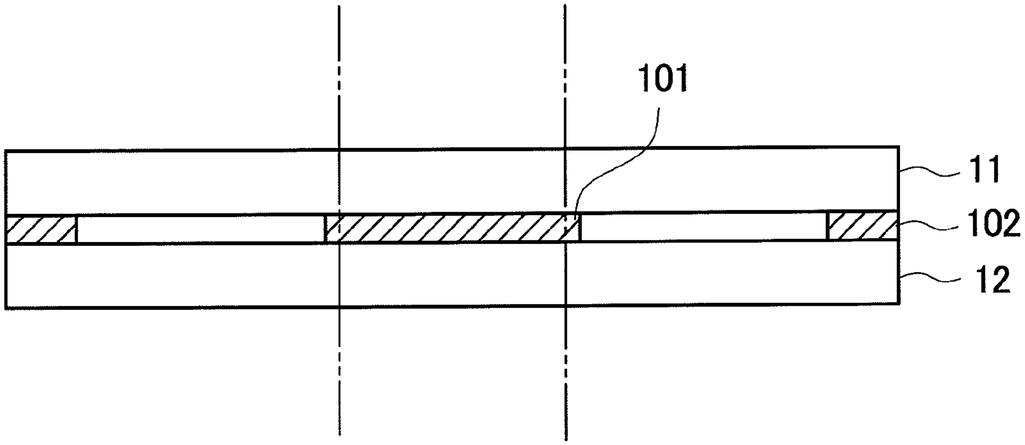
FIG. 6 is a sectional view of the liquid crystal display panel during the course of processing.

The liquid crystal 103 is sandwiched between the upper substrate 11 and the lower substrate 12 and is sealed by sealing members. The sealing members include an inner sealing member 101 and an outer sealing member 102. FIG. 5 is a plan view of the liquid crystal display panel 10 during the course of processing. FIG. 6 is a sectional view taken along line A-A of FIG. 5. FIGS. 5 and 6 omit pixel electrodes and so on. The sealing members are formed in hatched portions enclosed by dotted lines in FIG. 5. The liquid crystal 103 is sealed between the outer sealing member 102 and the inner sealing member 110. After the liquid crystal 103 is sealed by the sealing members 101 and 102, the portions indicated by the chain double-dashed lines shown in FIGS. 5 and 6 are cut and hollowed out to form holes.

The holes may be formed by mechanical cutting. This is because propagation of cracks during cutting can be prevented because the inner sealing member 101 is formed close to the cut portion. In addition to the mechanical cutting, water-jet cutting may be employed whereby glass is cut by jetting out high-speed water onto a cut portion.

The lower polarizer 14 and the upper polarizer 13 are bonded to the liquid crystal panel thus formed to form the liquid crystal display panel 10. The lower polarizer 14 and the upper polarizer 13 are provided with holes in advance and then bonded to the lower substrate 12 and the upper substrate 11, respectively. The liquid crystal display panel 10 in which the upper polarizer 13, the upper substrate 11, the lower substrate 12, and the lower polarizer 14 are bonded together is housed in a liquid crystal display panel frame 15 shown in FIG. 3.

Figure 7:
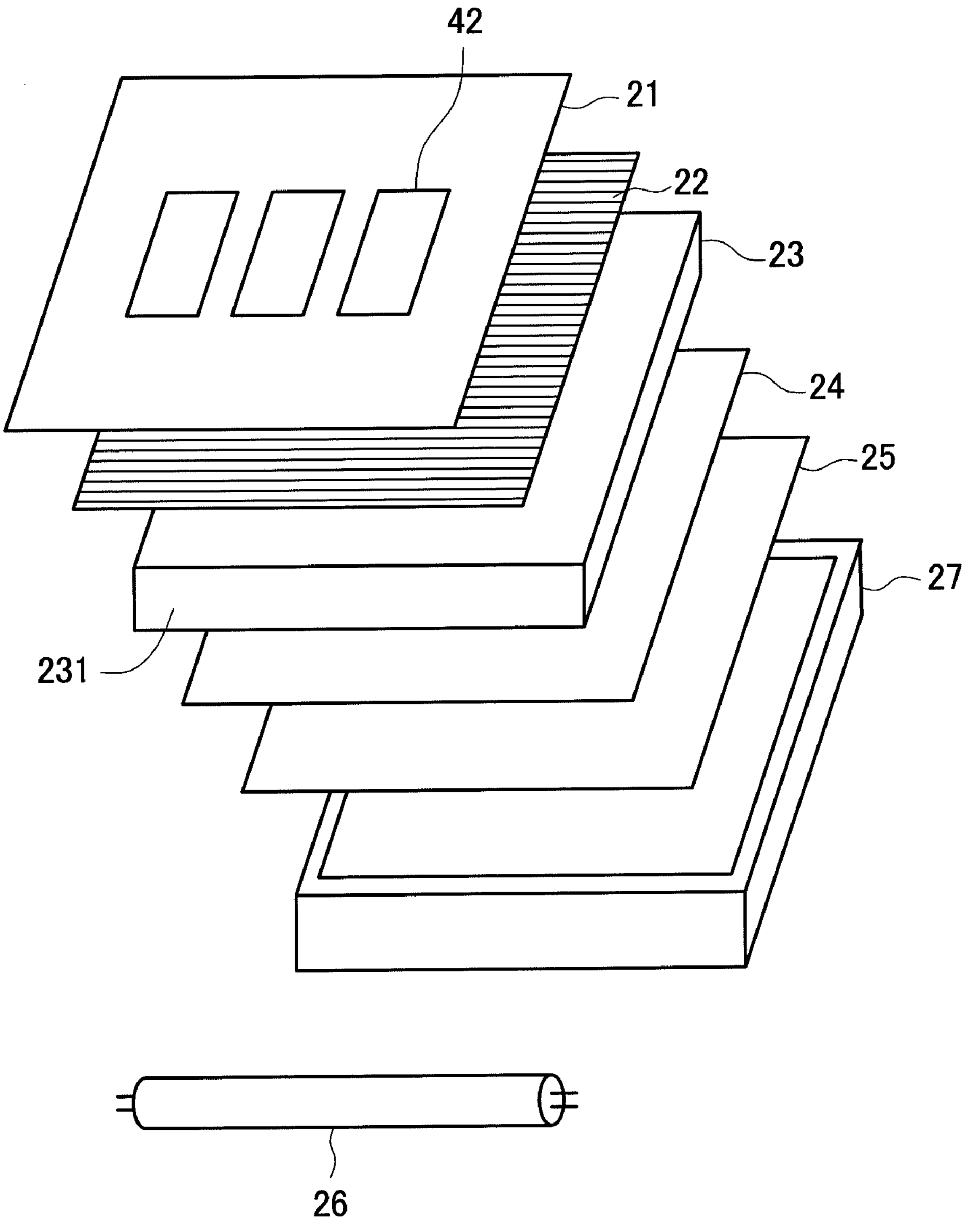
FIG. 7 is an exploded perspective view of a backlight.

FIG. 7 is a perspective view of the components of the backlight 20. In FIG. 7, the light source is a fluorescent tube 26. The fluorescent tube 26, only one is shown in FIG. 7, is disposed on both sides of a light guide 23. Although the light source in FIG. 7 is the fluorescent tube 26, it is needless to say that it may be an LED or the like. The light guide 23 directs the light from the light source disposed on a side 231 toward the main surface of the liquid crystal display panel 10.

A lower diffusion sheet 24 underlies the light guide 23. The lower diffusion sheet 24 makes the light from the light guide 23 toward the liquid crystal display panel 10 uniform. A reflecting sheet 25 underlies the lower diffusion sheet 24. The reflecting sheet 25 reflects downward light from the light guide 23 to increase the amount of light available on the liquid crystal display panel 10.

A prism sheet 22 is disposed on the light guide 23. The prism sheet 22 has triangular-cross-section microlenses arranged at a regular pitch, for example, 50 μm in one direction. The light traveling from the light guide 23 toward the liquid crystal display panel 10 includes a lot of light traveling at angles to the main surface of the liquid crystal display panel 10. Since the microlenses formed on the prism sheet 22 focus the light toward the apexes of the triangular cross-section lenses, the microlenses increase light traveling at right angles to the main surface of the liquid crystal display panel 10, thereby improving the luminance of the liquid crystal display panel 10. Although the number of the prism sheet 22 of this embodiment is one, another microlens sheet whose lens array is perpendicular to the uni-directional lens array of the prism sheet 22 may be used. This structure further improves the luminance because the light from the backlight 20 is converged from top and bottom and from the right and left.

An upper diffusion sheet 21 is disposed on the prism sheet 22. The role of the upper diffusion sheet 21 is to make the light from the prism sheet 22 uniform and to reduce moiré due to the interference between the prism sheet 22 and the pixel structure formed on the liquid crystal display panel 10. Referring to FIG. 7, the upper diffusion sheet 21 has three backlight holes 42. The backlight holes 42 are formed by cutting at the same time the upper diffusion sheet 21 is formed.

Although the backlight holes 42 are shown only in the upper diffusion sheet 21 in FIG. 7, the backlight holes 42 are actually formed in all the backlight components. The holes of the backlight components are also formed at the same time the components are formed. The backlight components are housed in a backlight frame 27.

Figure 8:
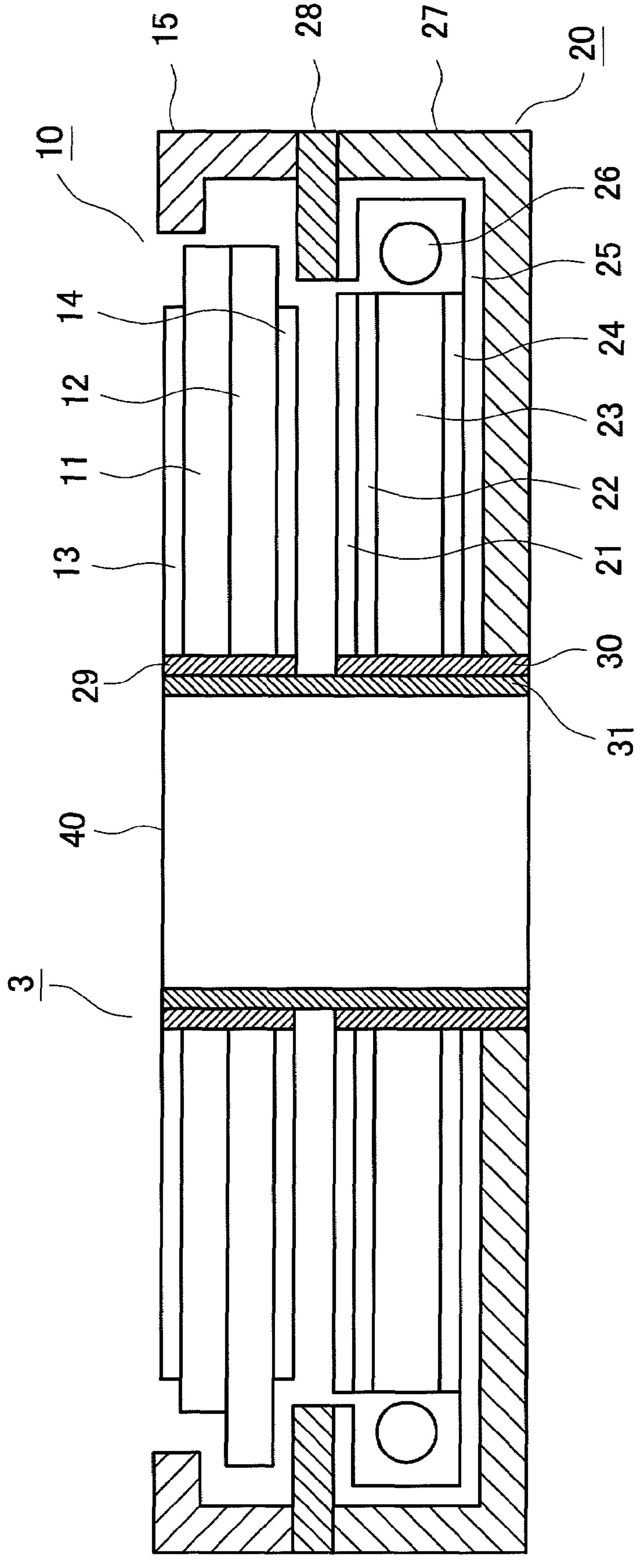
FIG. 8 is a sectional view of a liquid crystal display panel according to a first embodiment of the invention.

FIG. 8 is a sectional view of the liquid crystal display device 3 according to the first embodiment of the invention. FIG. 8 is a detail view of FIG. 2, showing only the liquid crystal display panel 10 and the backlight 20 except the rotating drums 2. The liquid crystal display panel 10 and the backlight 20 are stacked with a light shielding member 28 therebetween. The light shielding member 28 serves to prevent the unnecessary light from the backlight 20 from leaking to the liquid crystal display panel 10 to decrease the image quality.

Referring to FIG. 8, a liquid crystal display panel-hole protecting member 29 is formed around the inner periphery of the hole 40 of the liquid crystal display panel 10. As shown in FIG. 4, the cut surfaces of the upper glass substrate 11 and the lower glass substrate 12 are exposed to the hole 40 of the liquid crystal display panel 10. This may cause cracks when a hard object comes in contact with the cut surfaces. If glass chips generated by the cracks enter the backlight 20, the light from the backlight 20 is made nonuniform. This is one of reasons why the structure in which the liquid crystal display panel 10 has the hole 40 in the effective screen, in which another display is provided is not put to practical use.

Figure 9:
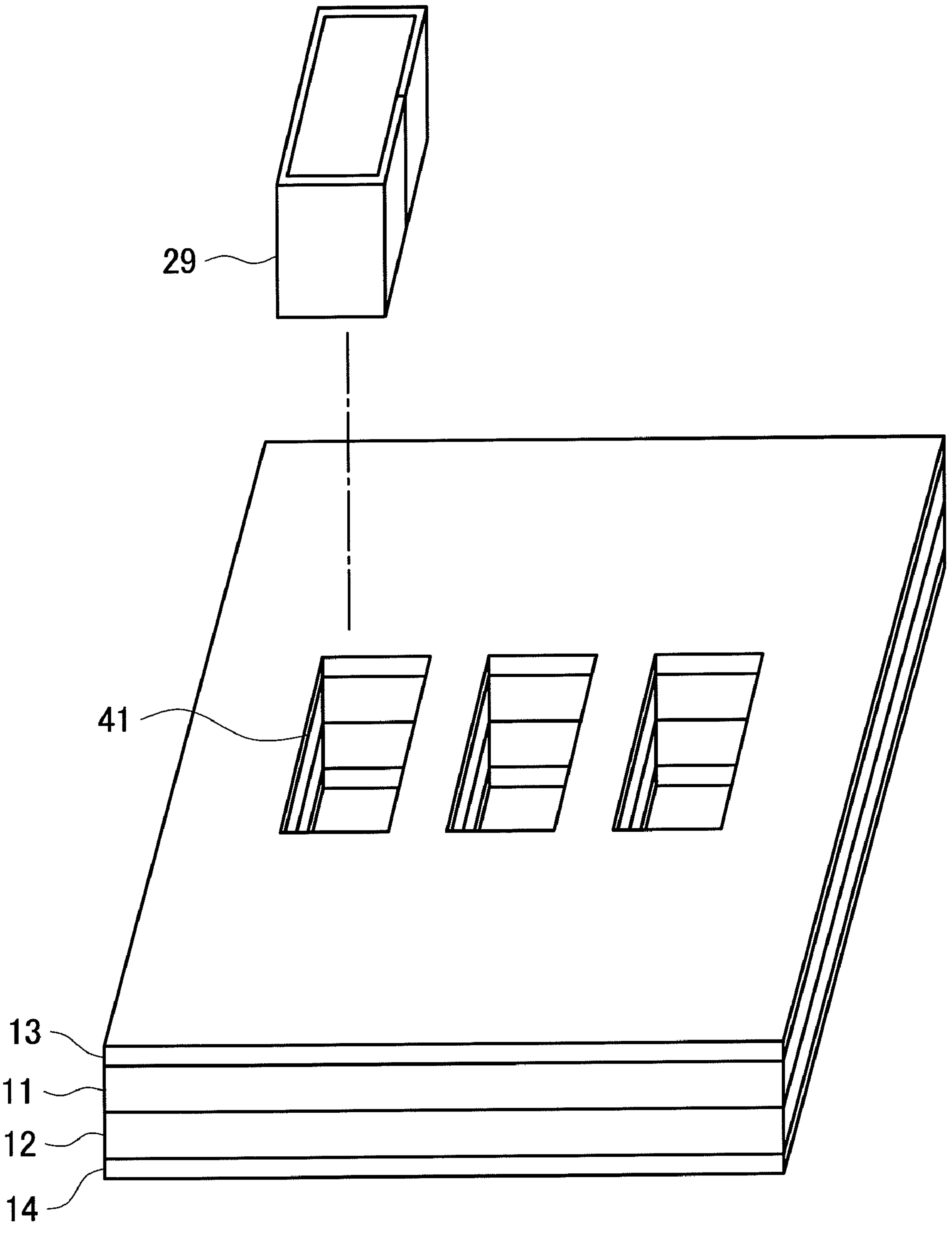
FIG. 9 is a perspective view of the liquid crystal display panel of the first embodiment.

The invention prevents cracks of the glass so as to prevent glass chips from affecting the backlight 20 by providing a protecting member around the inner periphery of the hole 40 of the liquid crystal display panel 10. FIG. 9 shows an example in which the protecting member 29 is provided around the liquid crystal display panel hole 41. FIG. 9 omits the liquid crystal display panel frame 15 because no protecting member is provided to the liquid crystal display panel frame 15. The protecting member 29 is a metal tape one side of which is coated with an adhesive. Examples of material for the metal tape in practical use are aluminum and copper. The adhesive here may have either electrical conductivity or an insulating property. An example of the electrically conductive adhesive is an acryl-based adhesive containing fine particles such as nickel or silver. The metal fine particles give conductively.

As shown in FIG. 9, the adhesive surface of the metal tape is bonded to the inner periphery of the hole 41 of the liquid crystal display panel 10. This makes the inside of the liquid crystal display panel hole 41 metal. The metal surface is given a potential common to the reference potential of the liquid crystal display panel frame 15 via a module-hole protecting member to be described later, and thus having electrical stability.

The holes 41 are often electrified because they are often disposed in contact with other components or in the vicinity of the rotating drums 2. When the protecting member 29 is electrified, the liquid crystal of the liquid crystal display panel 10 may be influenced by the electricity to affect a display image. Furthermore, if the protecting member 29 is electrified to cause sparks, the liquid crystal driving circuit and so on may be damaged. Accordingly, in this embodiment, the liquid crystal display panel-hole protecting member 29 is given a stable common potential.

Figure 10:
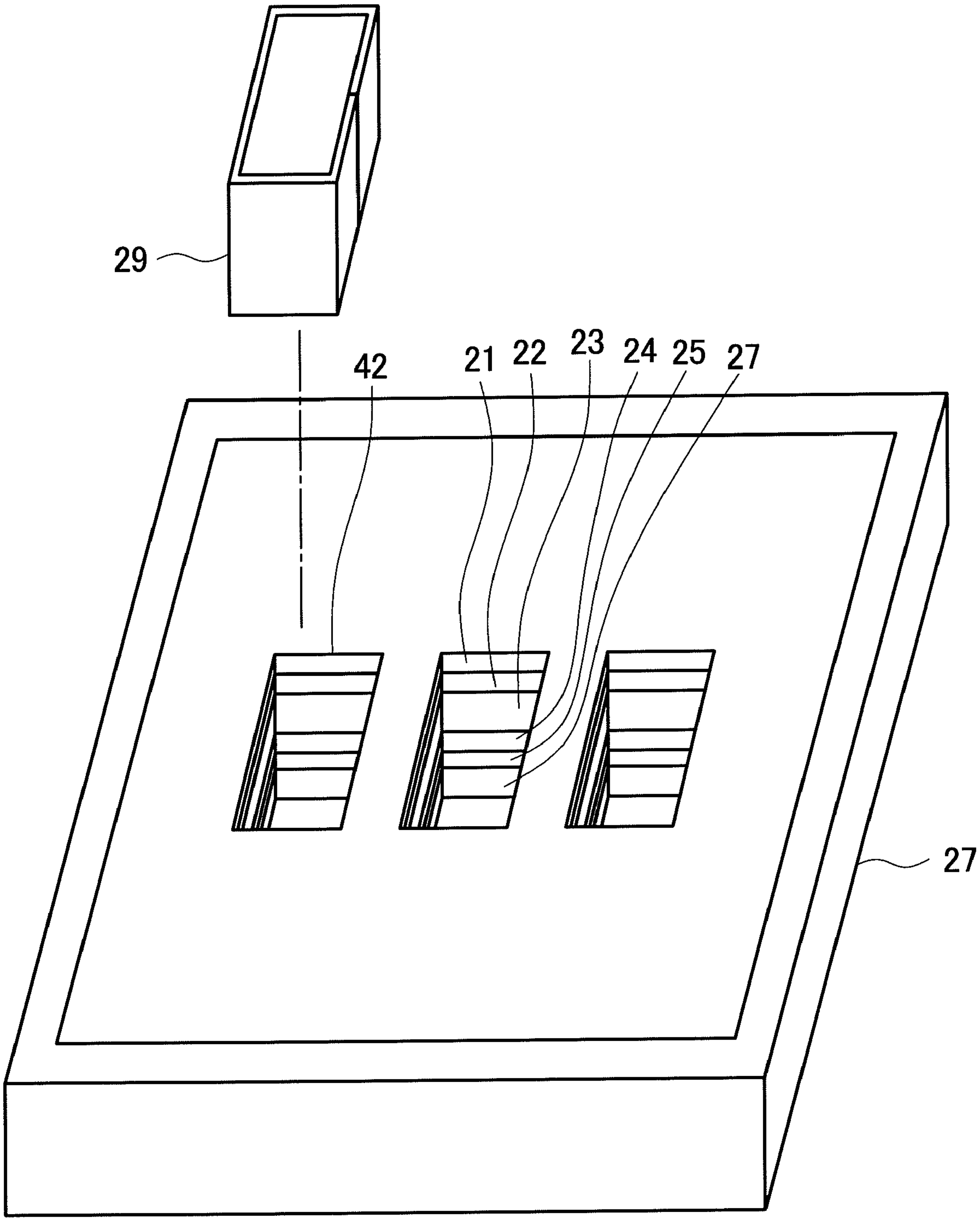
FIG. 10 is a perspective view of a backlight of the first embodiment.

FIG. 10 is an example in which a backlight-hole protecting member 30 is provided around the inner periphery of the hole 42 of the backlight 20. The role of the backlight-hole protecting member 30 is to prevent the components of the backlight 20 from damages and deformation and to prevent foreign matter from entering between the optical components, thereby preventing deterioration of the quality of the backlight 20.

In this case also, a metal tape having an adhesive on one side is disposed around the inner periphery of the hole 42 as in the liquid crystal display panel 10. In this case, an electrically conductive adhesive is used. The conductive adhesive side of the metal tape is bonded to the inner periphery of the backlight 20 after the backlight components are assembled.

It is important for the protecting member 30 of the backlight holes 42 not to leak the light of the backlight 20 into the hole 42. Thus, the backlight protecting member 30 desirably has high light-shielding performance. Metal tape meets the object because it has light-shielding performance.

The protecting member 30 is formed so as to cover the hole of the backlight frame 27 because the backlight frame 27 covers the lower surface of the reflecting sheet 25. The backlight frame 27 is made of metal, and is at the common potential.

Referring to FIG. 8, a module-hole protecting member 31 is disposed around the inner periphery of the liquid crystal display device hole (module hole) 40 that is formed of the liquid crystal display panel hole 41 and the backlight hole 42 after the liquid crystal display panel 10 and the backlight 20 are assembled as a module by the method described in FIGS. 9 and 10. The module-hole protecting member 31 is also made of metal tape having an electrically conductive adhesive on one side. The module hole 40 may cause sparks if electrified when another object comes into contact therewith or the rotating drum 2 comes close thereto, having a bad influence on nearby electric circuits and so on. Therefore, the protecting member 31 desirably has electrical conductivity. The module-hole protecting member 31 is electrically continuous to the backlight frame 27 via the backlight protecting member 30, to which a constant potential is applied, thus having electrical stability.

As described above, according to this embodiment, the liquid crystal display panel holes 41 have the protecting members 29, the backlight holes 42 have the protecting members 30, and the module holes 40 have the protecting members 31. This structure prevents the module holes 40 from mechanical damages and electrification. Thus, the liquid crystal display device 3 can be achieved which is capable of another display in the holes 40 formed in the screen.

Second Embodiment

Figure 11:
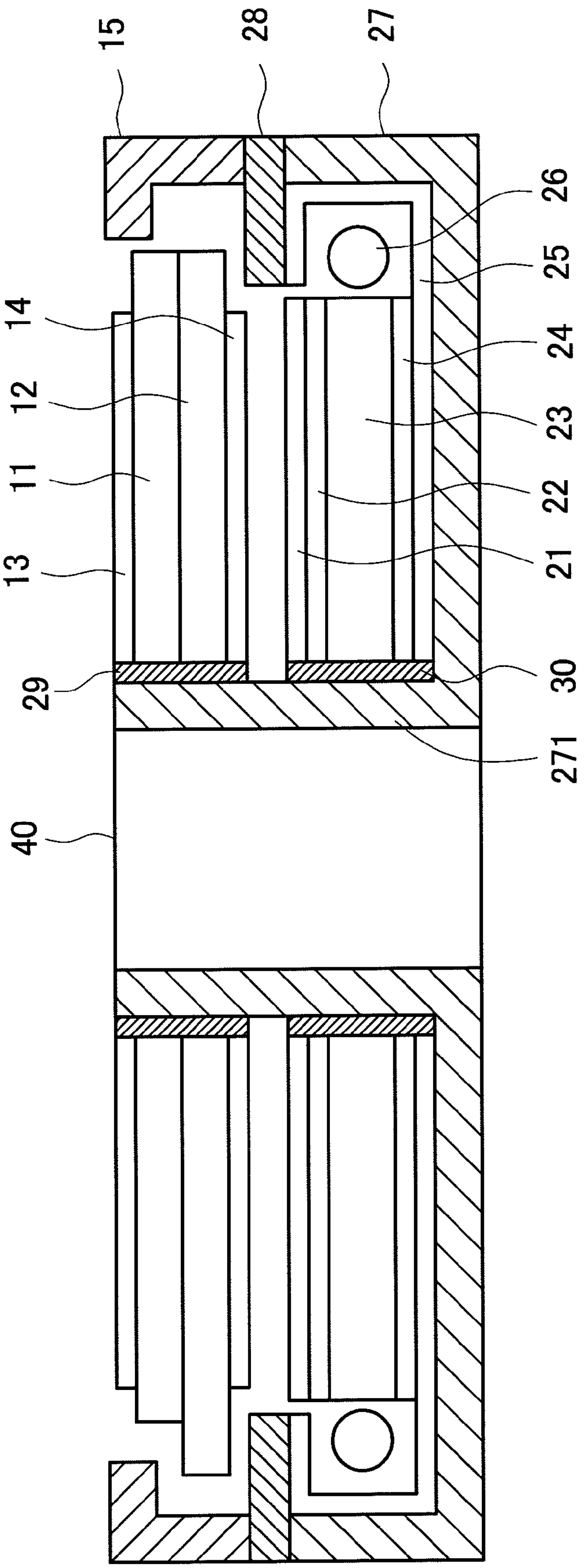
FIG. 11 is a sectional view of a liquid crystal display panel according to a second embodiment of the invention.

FIG. 11 is a sectional view of a liquid crystal display device according to a second embodiment of the invention. FIG. 11 is a detail sectional view of FIG. 2, showing only the liquid crystal display panel 10 and the backlight 20 except the rotating drums 2. In FIG. 11, the structure of the liquid crystal display panel 10 and the method for forming the protecting member 29 for the liquid crystal display panel hole 41 are the same as those of the first embodiment. Although the structure of the backlight 20 and the method for forming the protecting member 30 for the backlight hole 42 are also the same as those of the first embodiment, there is no need for the backlight-hole protecting member 30 to cover the backlight frame 28.

The difference from the first embodiment is the structure of the module-hole protecting member 31. In the second embodiment, as shown in FIG. 11, the protecting member for the module hole 40 has a flange 271 in the hole of the backlight frame 27, and the flange 271 is used as the module-hole protecting member 31.

The flange 271 can be formed at the same time the backlight frame 27 is formed by pressing. The backlight components including the optical sheets 21, 22, 24, and 25 and the light guide 23 are first assembled, in which the protecting member 30 is formed in the hole 42, and then the backlight components are inserted into the flange 271 of the backlight frame 27. Then, the liquid crystal display pane 110 in which the protecting member 29 is formed around the inner periphery of the liquid crystal display panel hole 41 is inserted into the flange 271 of the backlight frame 27.

In this case, the flange 271 of the backlight frame 27 is made of metal. Therefore, the backlight-hole protecting member 30 and the liquid crystal display panel-hole protecting member 29, if they have electrical conductivity, are brought into conduction automatically by contact with the flange 271 of the backlight frame 27, so that a constant potential can be applied. The flange 271 of the backlight frame 27 acts as a mechanical protection for the liquid crystal display panel hole 41 and the backlight hole 42, and as an electric shield. The coaxial structure of the liquid crystal display panel hole 41 and the backlight hole 42 facilitates alignment between the liquid crystal display panel 10 and the backlight 20.

Third Embodiment

The section of a liquid crystal display device of this embodiment is the same as FIG. 11 of the second embodiment but is different in the materials of the backlight frame 27, the liquid crystal display panel-hole protecting member 29, and the backlight-hole protecting member 30. In the second embodiment, the backlight frame 27 is made of metal, and by using the metal backlight frame 27, a common potential is applied to the protecting member 29 of the liquid crystal display panel hole 41 and the protecting member 30 of the backlight holes 42.

However, in some cases, the backlight frame 27 needs to be molded not of metal but of resin from the viewpoint of cost, weight and so on. In this case, a common potential cannot be applied to the liquid crystal display panel-hole protecting member 29 and the backlight-hole protecting member 30 via the backlight frame 27.

In the third embodiment, the backlight frame 27 is made of insulating resin. The flange 271 of the backlight frame 27 acts as a mechanical protection for the liquid crystal display panel hole 41 and the backlight hole 42 but does not act to apply a common potential to the protecting members 29 and 30 of the liquid crystal display panel hole 41 and the backlight hole 42. This eliminates the need to use a metallic conductive member for the protecting member 29 of the liquid crystal display panel hole 41 and the protecting member 30 of the backlight hole 42. It should be noted that, with the structure of this embodiment, the use of conducting members may cause electrification because of isolation, causing electric field disturbance or the like of the liquid crystal display panel 10.

In this embodiment, the liquid crystal display panel-hole protecting member 29 and the backlight-hole protecting member 30 are made of polyethylene terephthalate (PET) tape whose one side is coated with an adhesive. The adhesive here may not have electrical conductivity. This embodiment has the advantage of remarkably reducing cracks of the glass substrate because the glass substrates 11 and 12 of the liquid crystal display panel 10 hardly come into contact with metal.

Fourth Embodiment

Figure 12:
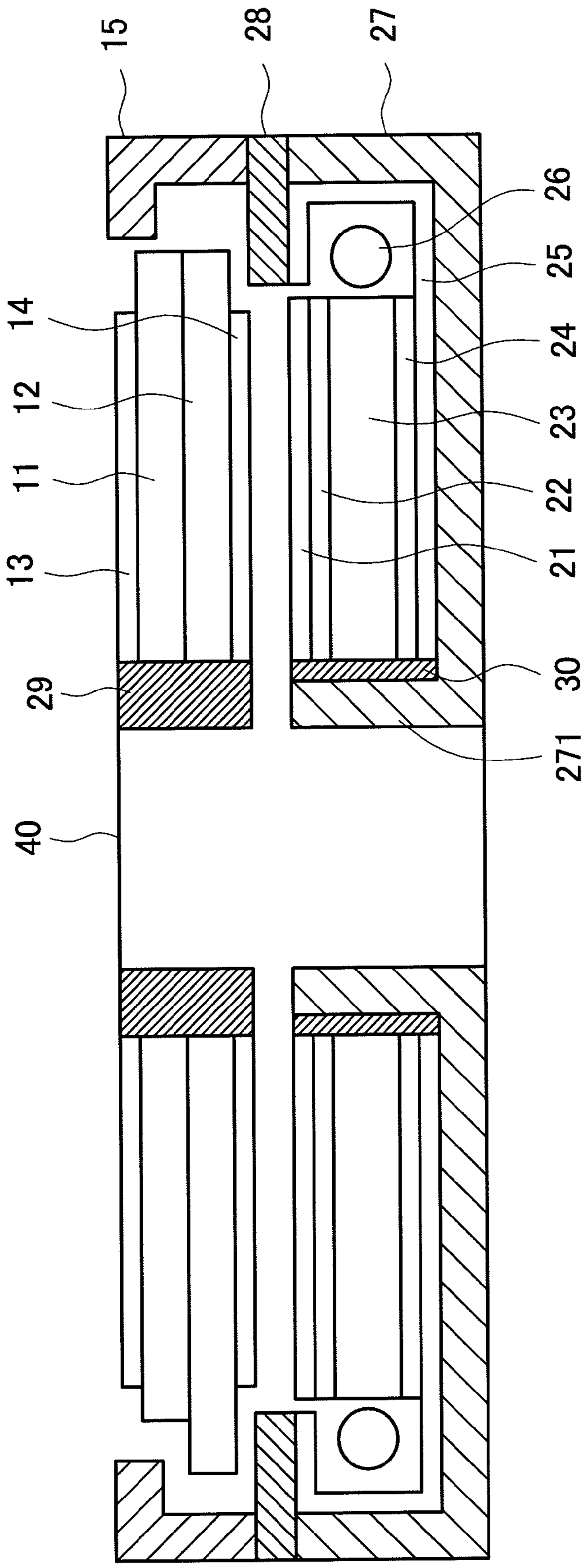
FIG. 12 is a sectional view of a liquid crystal display panel according to a fourth embodiment of the invention.

FIG. 12 shows a liquid crystal display device according to a fourth embodiment of the invention. The difference from the second and third embodiments is that the flange 271 of the backlight frame 27 is low in height in this embodiment. That is, the role of the flange 271 of the backlight frame 27 as a module-hole protecting member is limited to the portion of the backlight. If the flange 271 at the backlight 20 is high, the backlight frame 27 is difficult to draw deeply if it is formed of metal. Forming the backlight frame 27 from resin also decreases yields.

This embodiment can reduce the cost of the display device as compared with the first and second embodiments by decreasing the height of the flange 271 of the backlight frame 27. The backlight flange 271 of this embodiment is made of metal or resin. Even if the backlight frame 27 is made of metal, the liquid crystal display panel-hole protecting member 29 of this embodiment does not always come into contact with the flange 271 of the backlight frame 27, so that there is no need to use metal member for the liquid crystal display panel-hole protecting member 29.

An example of the material for the liquid crystal display panel-hole protecting member 29 for use in this embodiment is PET film having an adhesive on one side. The liquid crystal display panel-hole protecting member 29 of this embodiment has not the flange 271 of the backlight frame 27 serving as a module-hole protecting member. This leads to the need for using the liquid crystal display panel-hole protecting member 29 with mechanical strength so as to protect the liquid crystal display panel hole 41 sufficiently.

If the backlight frame 27 is made of metal, the backlight-hole protecting member 30 may be made of either the metal tape as in the first and second embodiments or the PET film as in the third embodiment. If the backlight frame 27 is made of resin, the backlight-hole protecting member 30 may not necessarily be made of metal tape but may be made of an insulating protecting member such as PET film.

Fifth Embodiment

Figure 13:
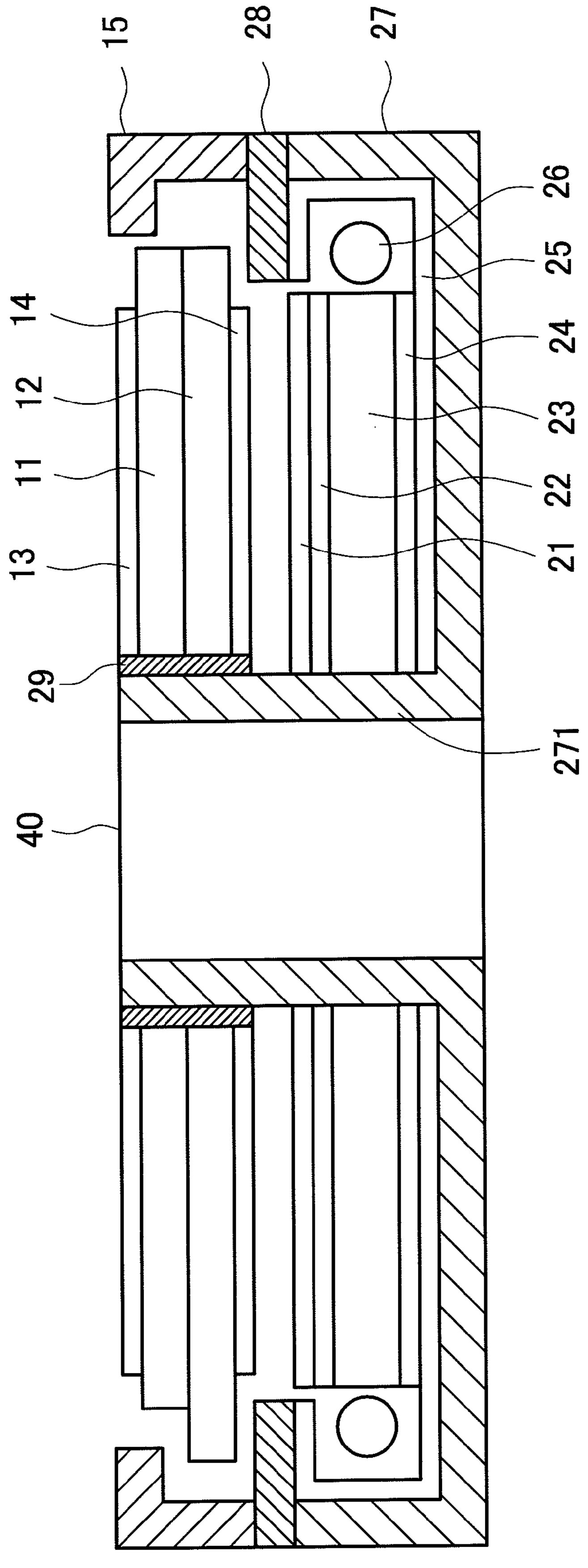
FIG. 13 is a sectional view of a liquid crystal display panel according to a fifth embodiment of the invention.

FIG. 13 shows a liquid crystal display device according to a fifth embodiment of the invention. The structure of this embodiment is relatively similar to that of the second embodiment. The difference in shape from the second embodiment is that the fifth embodiment has not the backlight-hole protecting member 30. The flange 271 of the backlight frame 27 also serves as the backlight-hole protecting member 30.

In this embodiment, the components of the backlight 20 are assembled using the flange 271 of the backlight frame 27 as a guide. That is, the reflecting sheet 25 is first inserted into the flange 271 of the backlight frame 27, and then the lower diffusion sheet 24, the light guide 23, the prism sheet 22, and the upper diffusion sheet 21 are inserted into the flange 271 of the backlight frame 27 in that order. Subsequently, the liquid crystal display panel 10 having the protecting member 29 in the liquid crystal display panel hole 41 is inserted into the flange 271 of the backlight frame 27.

In this embodiment, the backlight hole 42 is protected by the flange 271. Correct control of the tolerances of the flange 271 and the backlight components prevents foreign matter from entering the backlight 20 from the exterior.

The material of the backlight frame 27 may be either metal or resin. If the backlight frame 27 is made of metal, the protecting member 29 for the liquid crystal display panel hole 41 may be made of either metal or an insulating material. If the protecting member 29 for the liquid crystal display panel hole 41 is made of metal, the metal tape as described in the first and second embodiments can be used. If the protecting member 29 for the liquid crystal display panel hole 41 is made of an insulating material, the PET film as described in the third embodiment can be used. In contrast, if the backlight frame 27 is made of resin, the protecting member 29 for the liquid crystal display panel hole 41 may not necessarily be metal but may be an insulating material.

Sixth Embodiment

Figure 14:
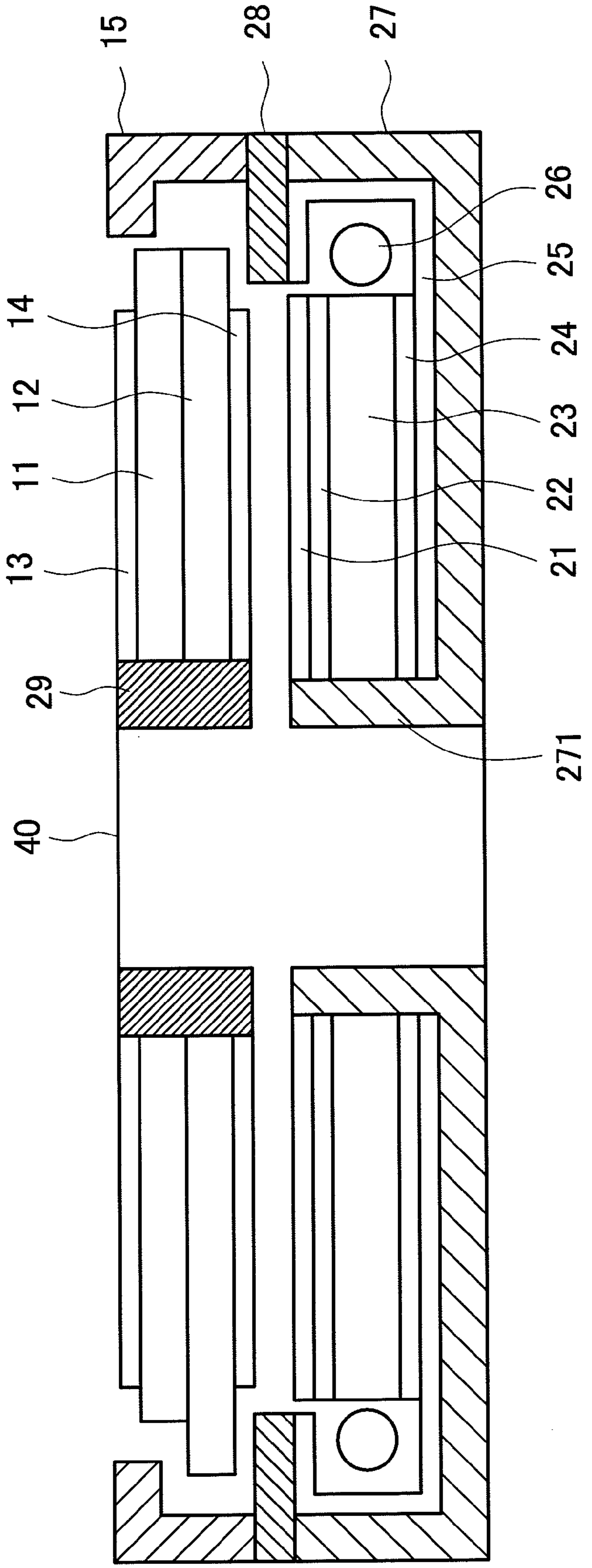
FIG. 14 is a sectional view of a liquid crystal display panel according to a sixth embodiment of the invention.

FIG. 14 shows a liquid crystal display device according to a sixth embodiment of the invention. The shape of this embodiment is relatively similar to that of the fourth embodiment. The difference in shape from the fourth embodiment is that the sixth embodiment has not the backlight-hole protecting member 30. The flange 271 of the backlight frame 27 also serves as the backlight-hole protecting member 30.

The advantage of the structure in which the flange 271 of the backlight frame 27 is low is the same as that described in the fourth embodiment. Also in this embodiment, the components of the backlight 20 are assembled using the flange 271 of the backlight frame 27 as a guide. The flange 271 acts as a mechanical protection for the backlight hole 42 and acts to prevent external foreign matter from entering the backlight 20. Therefore, it is necessary to prevent formation of clearance between the flange 271 and the backlight components by controlling the tolerances of the flange 271 and the components appropriately. The tolerance of the flange 271 can be decreased as the flange 271 decreases in height. This is the advantage of the sixth embodiment over the fifth embodiment. The protecting member 29 for the liquid crystal display panel hole 41 needs to be made of an insulating material such as PET film having an adhesive on one side, as in the fourth embodiment.

According to this embodiment, the protecting member 30 for the backlight hole 42 can be omitted by using the flange 271 of the backlight frame 27. This simplifies the structure of the display device, offering an advantage in reducing the cost of the display device.

Seventh Embodiment

The backlight 20 of the first to sixth embodiments is a side-lighting backlight in which the light source is disposed on both sides of the light guide 23. The side-lighting backlight 20 can be reduced in thickness but sometimes provides insufficient intensity. In contrast, the backlight 20 of this embodiment shown in FIG. 15 is a so-called direct-lighting type backlight 20 in which the light source is disposed directly under the liquid crystal display panel 10, allowing sufficient luminance or be applied for the liquid crystal display device 3.

Figure 15:
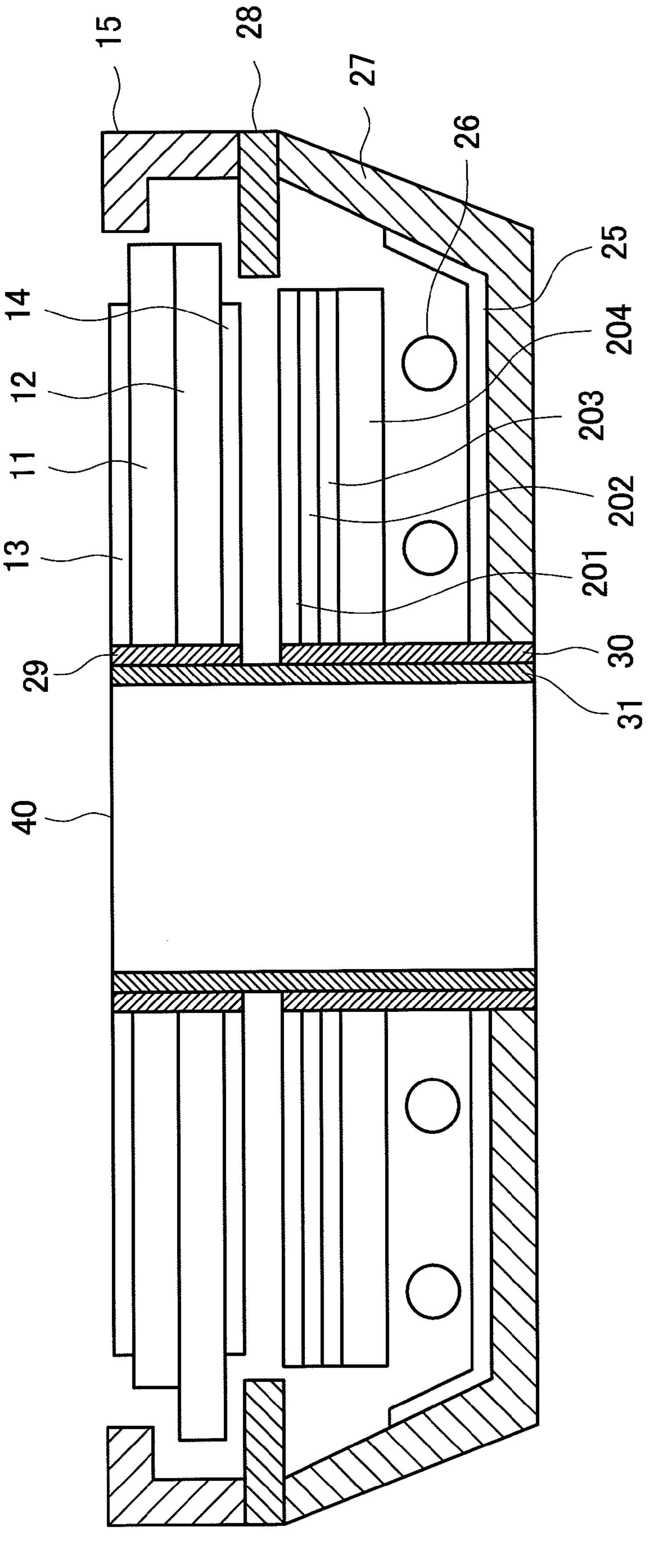
FIG. 15 is a sectional view of a liquid crystal display panel according to a seventh embodiment of the invention.

Referring to FIG. 15, the structure of the liquid crystal display panel 10 is similar to that of the first embodiment. The backlight 20 uses the fluorescent tube 26 as a light source. This embodiment uses four fluorescent tubes 26. A large number of fluorescent tubes 26 can be disposed because the fluorescent tubes 26 are disposed directly under the liquid crystal display panel 10.

A diffuser 204 is disposed above the fluorescent tubes 26. This is to prevent only the part around the fluorescent tubes 26 from being seen bright. There are three diffusing sheets, a first diffusing sheet 201, a second diffusing sheet 202, and a third diffusing sheet 203, on the diffuser 204. The role of the diffusing sheets 201 to 203 is, like the diffuser 204, to make the light from the backlight 20 uniform. Three diffusing sheets are used not only to diffuse the light but also to focus the light toward the liquid crystal display panel 10.

The reflecting sheet 25 is disposed below the fluorescent tubes 26. The reflecting sheet 25 acts to direct the light from the fluorescent tubes 26 toward the liquid crystal display panel 10, thereby making effective use of the light for the liquid crystal display panel 10. The foregoing backlight components are housed in the backlight frame 27. Although the fluorescent tubes 26 are used as a light source, another light source such as an LED may be used.

After the backlight components are housed in the backlight frame 27, the backlight-hole protecting member 30 is formed around the inner periphery of the backlight hole 42. The backlight-hole protecting member 30 in this case is metal tape having a conducting adhesive on one side, as in the first embodiment.

After the backlight 20 is formed as describe above, the liquid crystal display panel 10 and the backlight 20 are stacked with the light shielding member 28 there between to form a module. The module-hole protecting member 31 is formed around the inner periphery of the module hole 40 common to the liquid crystal display panel 10 and the backlight 20. The module-hole protecting member 31 here is also made of metal tape having a conducting adhesive on one side, as in the first embodiment.

In the above description, the structure of the liquid crystal display panel-hole protecting member 29, the backlight-hole protecting member 30, and the module-hole protecting member 31 is the same as that of the first embodiment using the side-lighting backlight 20. However, even the direct-lighting backlight 20 can employ the structures of the side-lighting backlight 20 according to the second to sixth embodiments.

The use of this embodiment allows a display device having the hole 40 in the liquid crystal display screen, in which another display can be provided, to increase the luminance of the display of the liquid crystal display panel 10, providing light and easy-to-see display.

While the invention has been described using an example in which the liquid crystal display device 3 is mainly used as the slot machine 1, the liquid crystal display device 3 of the invention can be applied not only to the slot machine 1 but also to other various machines. For example, the structure of this invention is useful for liquid crystal display panels used in the display panels of recent pachinko machines in which part of the liquid crystal display panel is hollowed, through which pachinko balls are passed. The invention can also be applied to vending machines having a liquid crystal display device part of which is hollowed, into which coins can be inserted. Furthermore, the invention can also be applied to mailboxes and coin-operated meters having a liquid crystal display panel.

What is claimed is:

1. A display device comprising:

a liquid crystal display panel and a backlight; wherein a liquid crystal display panel hole formed in the liquid crystal display panel, a first protecting member formed around the inner periphery of the liquid crystal display panel hole, a backlight hole formed in the backlight, a second protecting member formed around the inner periphery of the backlight hole, the liquid crystal display panel hole and the backlight hole form a common hole.

2. The display device according to claim 1, wherein the first protecting member is made of metal, the metal being at a potential common to the reference potential of the liquid crystal display panel.

3. The display device according to claim 1, wherein the first protecting member is a metal tape having an adhesive on one side.

4. The display device according to claim 1, wherein the first protecting member is an insulator.

5. The display device according to claim 1, wherein the second protecting member is made of the same material as the protecting member around the inner periphery of the liquid crystal display panel hole.

6. The display device according to claim 1, wherein the second protecting member is made of a material different from the protecting member around the inner periphery of the liquid crystal display panel hole.

7. The display device according to claim 1, wherein the second protecting member is a light-shielding member.

8. A display device comprising:

a liquid crystal display panel and backlight; wherein a liquid crystal display panel hole formed in the liquid crystal display panel, a first protecting member formed around the inner periphery of the liquid crystal display panel hole, a backlight hole formed in the backlight, a second protecting member around the inner periphery of the backlight hole, and the liquid crystal display panel hole and the backlight hole form a common hole, and a third protecting member is formed around the inner periphery thereof.

9. The display device according to claim 8, wherein the third protecting member is made of metal, the metal being at a potential common to the reference potential of the liquid crystal display panel.

10. The display device according to claim 8, wherein the third protecting member is a metal tape having an adhesive on one side.

11. The display device according to claim 8, wherein the third protecting member is an insulator.

* * * * *